United States Patent Office 2,780,061
Patented Feb. 5, 1957

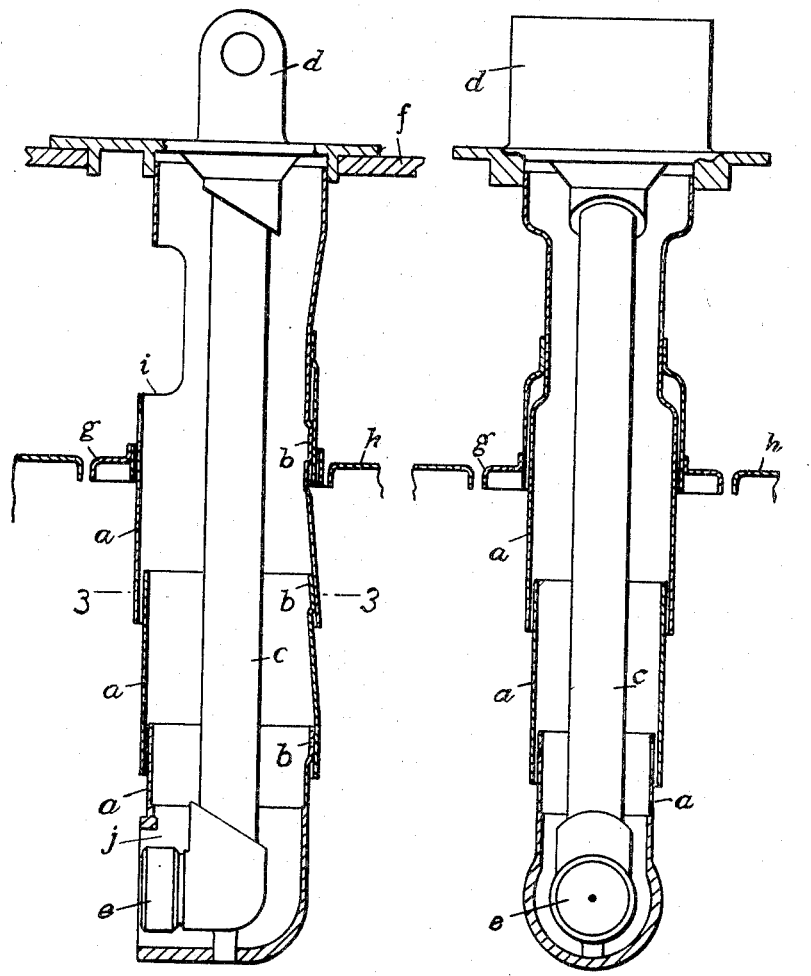

2,780,061
LIQUID FUEL BURNER FOR A COMBUSTION CHAMBER PROVIDED WITH A SURROUNDING AIR JACKET

John Stanley Clarke, Blacko, and Squire Ronald Jackson, Burnley, England, assignors to Joseph Lucas (Industries) Limited, Birmingham, England Application May 8, 1953, Serial No. 353,762

1 Claim. (Cl. 60—39.66)

This invention relates to the liquid fuel burners used in the combustion chambers of jet engines, gas turbines and for other purposes, the burners being of the kind in which the stem of the burner which extends into the combustion chamber and which carries the fuel-discharge nozzle, is surrounded by a duct which conveys an airstream to the burner nozzle from an air jacket surrounding the combustion chamber.

The object of the invention is to provide an air duct in a form which minimizes the formation on the outer surface of the duct of carbon deposits derived from the burning fuel, and obviates overheating of either the said duct or the fuel pipe contained within it.

The invention comprises an air duct constructed from a series of overlapping tubular components so spaced as to provide a narrow air outlet passage between each adjacent pair of the components.

In the accompanying drawings:

Figure 1 is a sectional side elevation and Figure 2 a sectional front elevation of a burner embodying the invention, Figure 3 being a sectional plan on the line 3—3 of Figure 1.

Referring to the drawings the air duct is constructed from a series of tubular metal components $a$ of circular, elliptical or any other convenient cross section and adapted to be assembled in overlapping relationship. Adjacent to one end each component has formed on it three or more protuberances $b$. The components are arranged in series by inserting one end of each into the adjacent end of the next component, the required spacing of the components being effected by the said protuberances, and the relative diameters of the overlapping ends being such as will provide narrow air passages between them, the protuberances serving to hold the said ends apart. If desired the components may be secured together by spot-welding or otherwise uniting the protuberances to the inner surface of the contiguous components.

The air duct surrounds the hollow stem $c$ which conveys liquid fuel from a fitting $d$ on the outer end of the stem to a nozzle $e$ on the inner end of the stem. The said fitting $d$ is attached to the wall $f$ of the air jacket, and on the duct is secured a flange $g$ which passes through a flanged hole in the wall $h$ of the combustion chamber, an air space being preferably provided between the peripheries of the flange and hole. Both the duct and the said stem extend through the air jacket into the combustion chamber. The part of the duct in the air jacket has formed in it an orifice $i$ through which air can enter from the air jacket. Also the part of the duct surrounding the nozzle is suitably apertured at $j$ to allow air to flow around the nozzle into the combustion chamber. Moreover, air can pass from the duct to the combustion chamber through the annular apertures between the overlapping ends of the duct components.

By means of a construction as above described, the aforesaid object of the invention is achieved in a simple and satisfactory manner.

Having thus described our invention what we claim as new and desire to secure by Letters Patent is:

A liquid fuel burner for a combustion chamber provided with a surrounding air jacket, comprising in combination a hollow fuel-supply stem adapted to extend through the air jacket into the combustion chamber, a fuel-discharge nozzle on the inner end of the stem, and an air duct surrounding the stem for conveying an air stream from the air jacket to the region occupied by the nozzle, the air duct being composed of overlapping tubular components spaced apart to provide between them narrow passages through which a limited outflow of air can take place, and the nozzle being surrounded by the adjacent end of the air duct which is apertured to allow air to be discharged from the said end after flowing around the nozzle.

References Cited in the file of this patent
UNITED STATES PATENTS 1,959,521   Bolt ------------------ May 22, 1934